(12) United States Patent
Craig (10) Patent No.: US 7,591,614 B2
(45) Date of Patent: Sep. 22, 2009

(54) CUTTING INSERT WITH SERRATIONS

(75) Inventor: Karen Anne Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/942,789

(22) Filed: Nov. 20, 2007

(65) Prior Publication Data
US 2009/0129874 A1    May 21, 2009

(51) Int. Cl.
*B23C 5/00* (2006.01)
*B23C 5/02* (2006.01)

(52) U.S. Cl. .................................. 407/66; 407/113

(58) Field of Classification Search ......... 407/113–116, 407/66, 67, 30, 33
See application file for complete search history.

(56) References Cited

U.S. PATENT DOCUMENTS

| | | | |
|---|---|---|---|
| 3,636,602 A * | 1/1972 | Owen | 407/113 |
| 3,875,631 A | 4/1975 | Malinchak | |
| 4,068,976 A | 1/1978 | Friedline | |
| 4,681,486 A | 7/1987 | Hale | |
| 5,085,542 A | 2/1992 | Nakayama et al. | |
| 5,221,164 A | 6/1993 | Allaire | |
| 5,921,721 A * | 7/1999 | Hintze et al. | 407/113 |
| 6,135,681 A | 10/2000 | Nuzzi et al. | |
| 6,447,218 B1 | 9/2002 | Lagerberg | |
| 7,008,145 B2 | 3/2006 | Astrakhan | |
| 7,144,205 B2 * | 12/2006 | Sheffler et al. | 407/103 |

* cited by examiner

*Primary Examiner*—Willmon Fridie
(74) *Attorney, Agent, or Firm*—Larry R. Meenan (57) ABSTRACT

A cutting insert has four quadrants defined by vertical and horizontal axes that pass through a centerline axis of the insert. The cutting insert further includes a top surface; a bottom surface; a plurality of clearance side surfaces extending between the top and bottom surfaces. A cutting edge is formed at an intersection between the top surface and the clearance side surfaces. A serration is formed in each clearance side surface such that two of the four quadrants that are diagonally opposite each other do not have serrations, and the other two of the four quadrants that are diagonally opposite each other include a pair of serrations. The cutting insert can be mounted to a milling cutter in a variety of patterns by rotating one cutting insert relative to another cutting insert in the same flute or in a different flute.

16 Claims, 9 Drawing Sheets

CUTTING INSERT WITH SERRATIONS

BACKGROUND OF THE INVENTION

The invention relates to a milling cutter having indexable cutting inserts with serrated cutting edges for metal cutting operations.

Cutting inserts with serrated cutting edges enable higher metal removal rates as compared with cutting inserts having non-serrated cutting edges. However, this is achieved at the expense of rougher surface finish.

Currently, milling cutters use cutting inserts with serrated cutting edges in even flutes only, or with several special types of inserts that need to be put into specific positions. This is cumbersome and inflexible, and requires many insert styles in some cases. In addition, possible body damage may occur if improper inserts are not in the appropriate pockets.

Therefore, there is a need to provide a cutting insert with serrated edges that can be used with conventional inserts where necessary to balance out the cutting action to provide a full cut with one rotation of the milling cutter, while being easily interchangeable without worry of damage to the cutter body.

BRIEF SUMMARY OF THE INVENTION

Briefly, according to this invention, there is provided a cutting insert having four quadrants defined by vertical and horizontal axes that pass through a centerline axis of the insert. The cutting insert comprises a top surface; a bottom surface; a plurality of clearance side surfaces extending between the top and bottom surfaces; a cutting edge formed at an intersection between the top surface and the plurality of clearance side surfaces; and a serration formed in each of the plurality of clearance side surfaces. Two of the four quadrants that are diagonally opposite each other do not have serrations, and the other two of the four quadrants that are diagonally opposite each other include a pair of serrations.

In another embodiment, a cutting insert comprises a top surface; a bottom surface; a plurality of clearance side surfaces extending between the top and bottom surfaces; a cutting edge formed at an intersection between the top surface and the plurality of clearance side surfaces; a wiper facet formed in the top surface; and a serration formed in each clearance side surface, wherein each serration is located so as to leave the wiper facet intact.

In yet another embodiment, a milling cutter comprises a cutter body having a rear shank and a plurality of cutting portions adjacent a front face of the cutter body that extend axially along a respective flute. Each cutting portion comprises a plurality of cutting inserts secured to a pocket. Each cutting insert has four quadrants defined by vertical and horizontal axes that pass through a centerline axis of the insert. Each cutting insert comprises a top surface; a bottom surface; a plurality of clearance side surfaces extending between the top and bottom surfaces. A cutting edge is formed at an intersection between the top surface and the plurality of clearance side surfaces. A serration is formed in each clearance side surface, wherein two of the four quadrants that are diagonally opposite each other do not have serrations, and wherein the other two of the four quadrants that are diagonally opposite each other include a pair of serrations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Referring now to FIGS. 1-10, a replaceable and indexable cutting insert according to an embodiment of the invention is shown generally at 10. The cutting insert 10 includes a top surface 12, a bottom surface 14 and a plurality of clearance side surfaces 16. A countersunk bore 18 extends from the top surface 12 to the bottom surface 14. The bore 18 is capable of accommodating a fastener, for example, a screw (not shown), for securing the cutting insert 10 to the cutter body. Alternatively, the cutting insert 10 can be secured by using a clamp (not shown). A cutting edge 20 is defined by the intersection of the top surface 12 and each of the side surfaces 16. In the illustrated embodiment, the cutting insert 10 is substantially square in shape for use in a milling cutter. However, it will be appreciated that the invention is not limited by the shape of the cutting insert, and that the invention can be practiced with cutting inserts having other polygonal shapes, such as rectangular, triangular, and the like.

Figure 5:
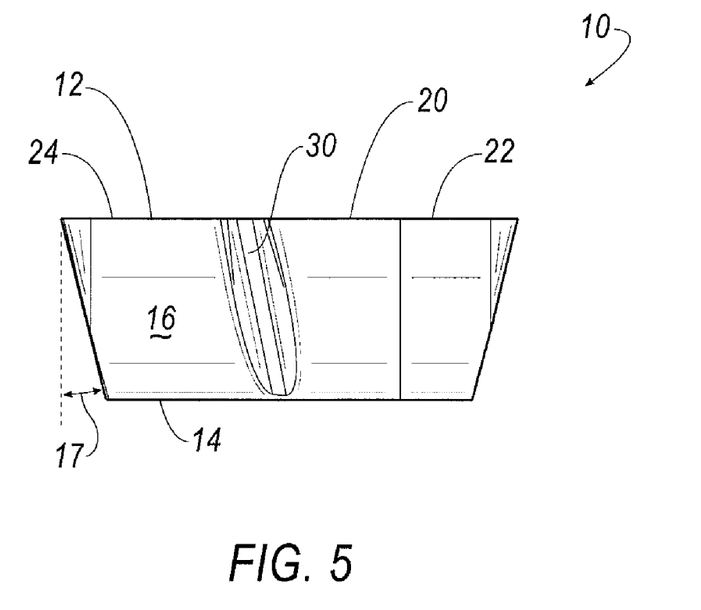
FIG. 5 is a side view of the cutting insert of FIG. 1.
Figure 6:
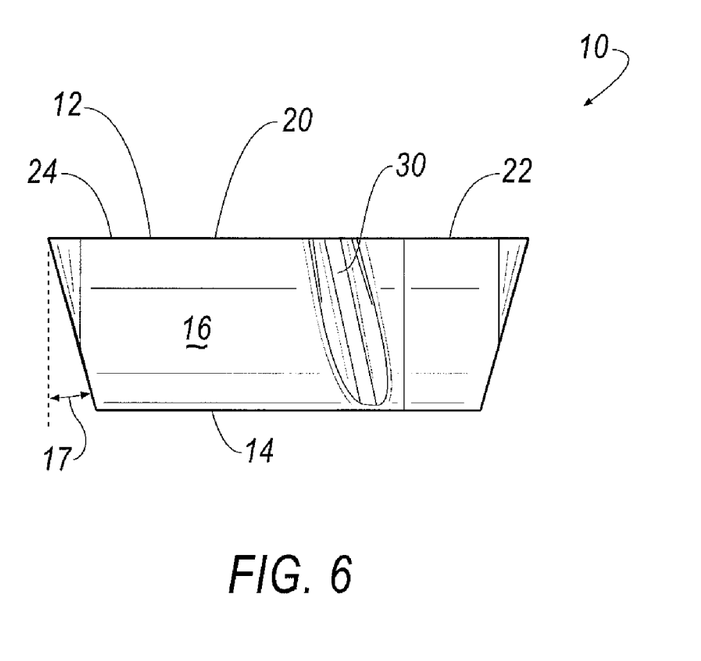
FIG. 6 is another side view of the cutting insert of FIG. 5 when rotated ninety degrees.
Figure 7:
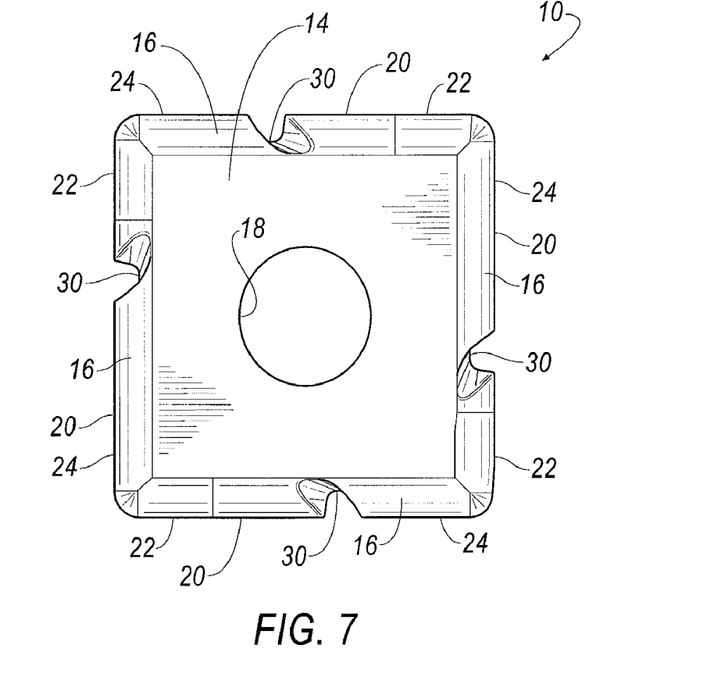
FIG. 7 is a bottom view of the cutting insert of FIG. 1.
Figure 8:
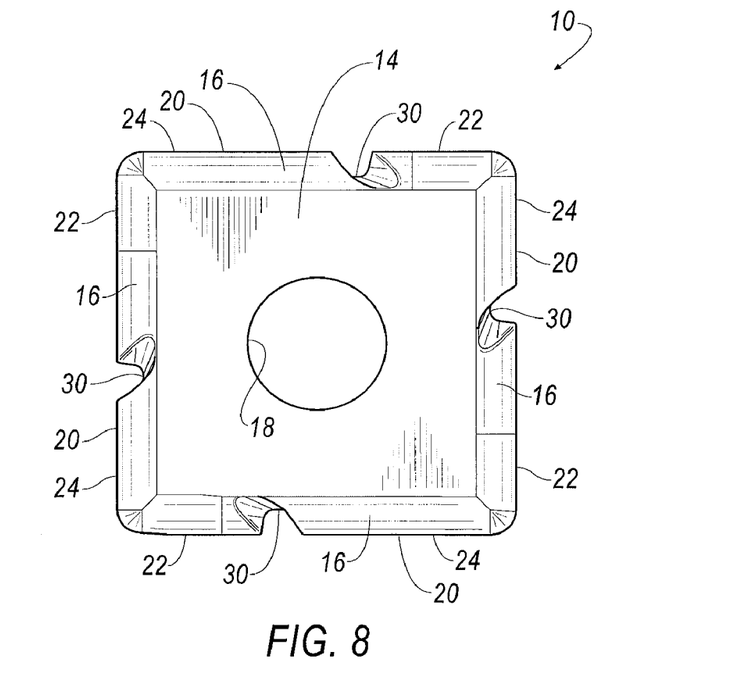
FIG. 8 is another bottom view of the cutting insert of FIG. 7 when rotated ninety degrees.
Figure 9:
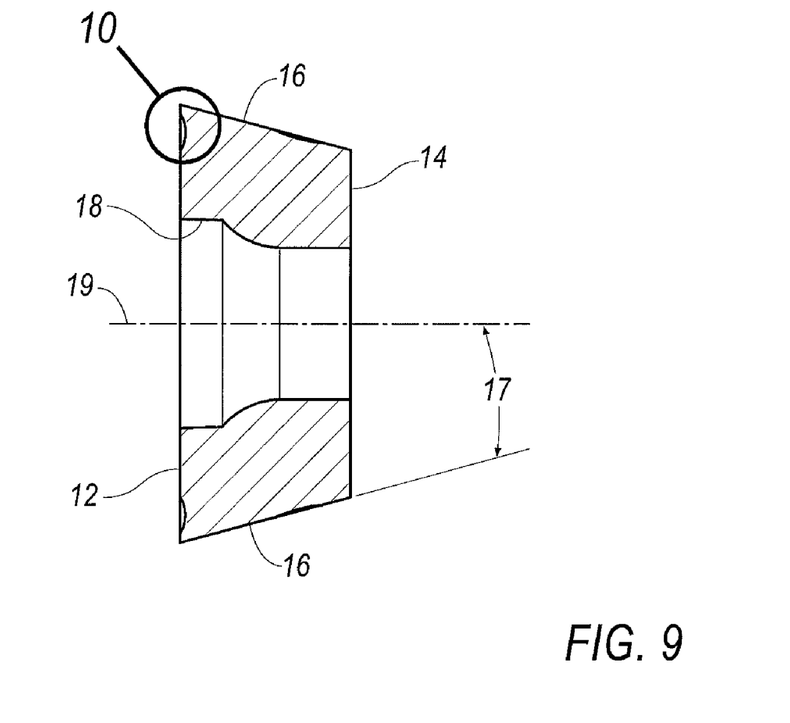
FIG. 9 is a cross-sectional view of the cutting insert taken along line 9-9 of FIG. 3.

As seen in FIGS. 5 and 6, the top and bottom surfaces 12, 14 are substantially parallel to each other. The side surfaces 16 are formed at an angle 17 with respect to a centerline axis 19 (z-axis) passing through the bore 18 of the cutting insert 10. For example, the side clearance surfaces 16 may be formed at an angle 17 of about fifteen (15) degrees with respect to the centerline axis 19. It will be appreciated that the invention is not limited by the angle 17, and that the invention can be practiced with any desirable angle to provide a proper amount of clearance for the cutting insert 10. For example, the angle 17 can be in the range of about five (5) degrees to about twenty-five (25) degrees. A wiper facet 22 proximate to each cutting edge 20 is formed at each corner of the cutting insert 10, as shown in FIGS. 1-4. The wiper facet 22 extends from each corner to about one-quarter of the length of each cutting edge 20.

Figure 10:
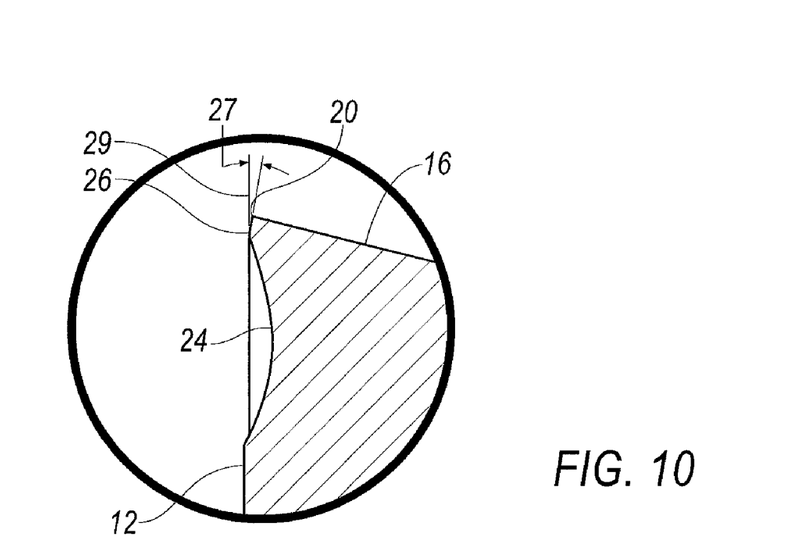
FIG. 10 is an enlarged view of the cutting edge of the cutting insert of FIG. 1.

As seen in FIG. 10, the top surface 12 also includes a beveled surface 24 and a flat, facet surface 26 extending between the beveled surface 24 and the cutting edge 20. The facet surface 26 is formed at an angle 27 with respect to an axis 29 that is substantially perpendicular to the centerline axis 19. The angle 27 can be the range of between about zero (0) degrees to about ten (10) degrees.

Figure 1:
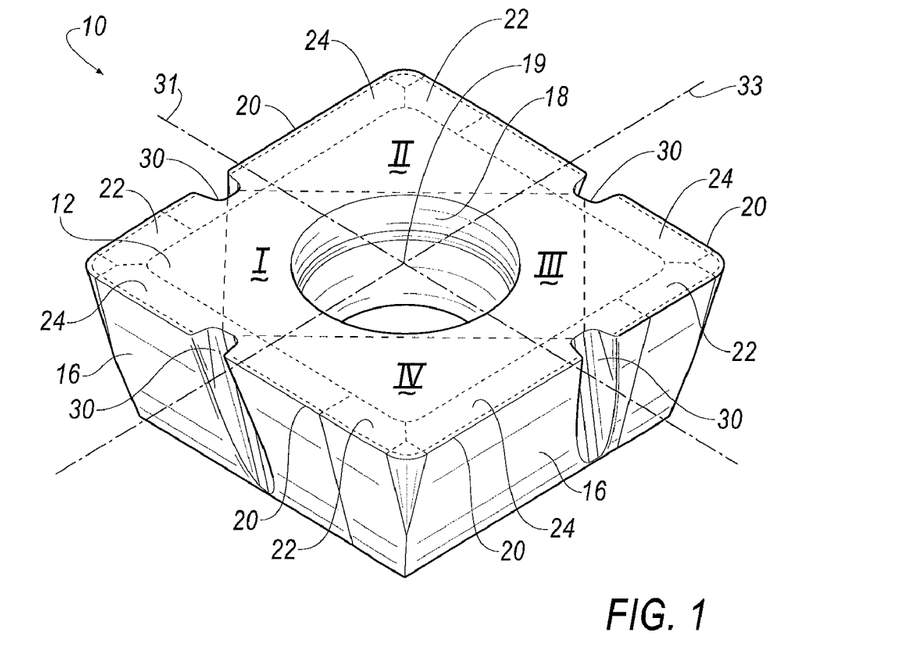
FIG. 1 is a perspective view of a cutting insert with serrations according to an embodiment of the invention.
Figure 2:
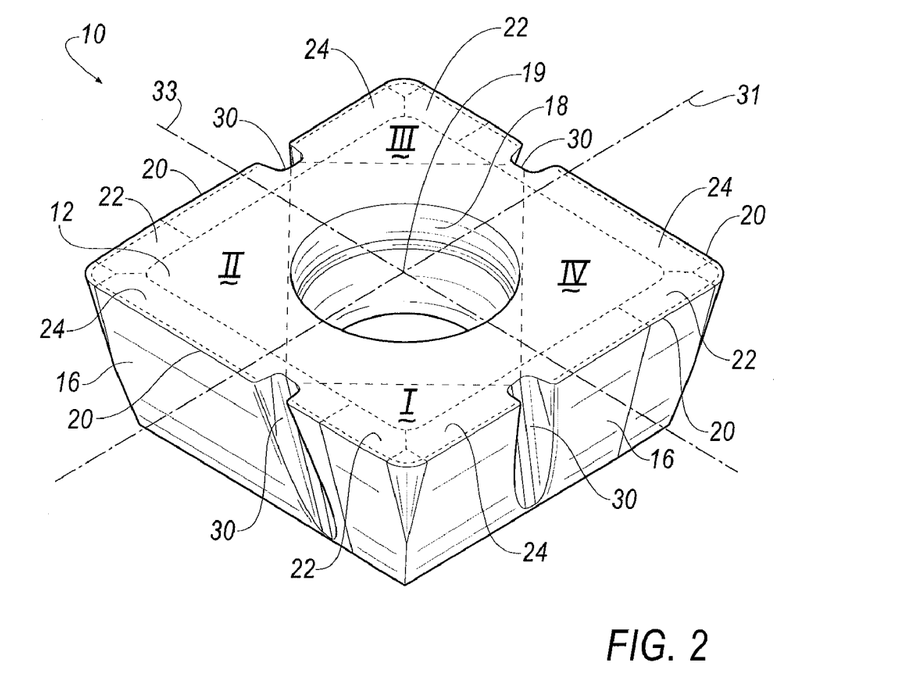
FIG. 2 is another perspective view of the cutting insert of FIG. 1 when rotated ninety degrees.
Figure 3:
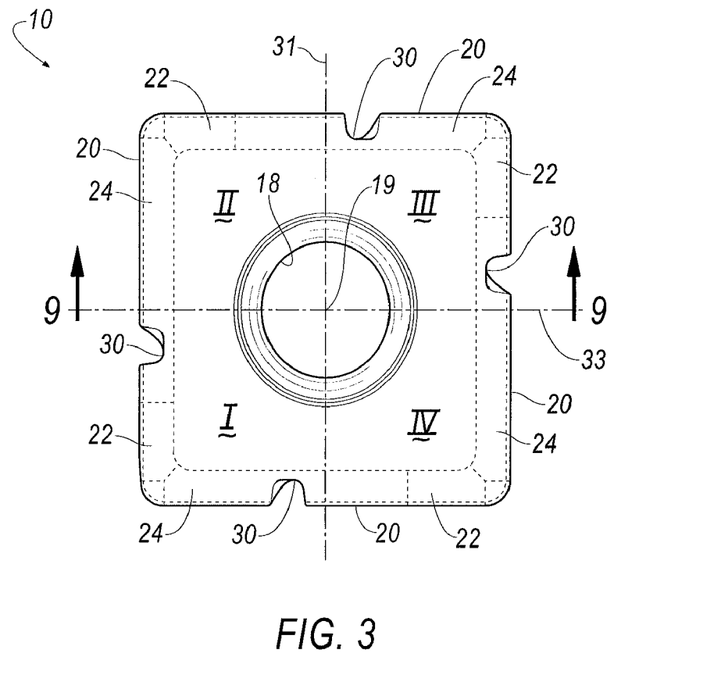
FIG. 3 is a top view of the cutting insert of FIG. 1.
Figure 4:
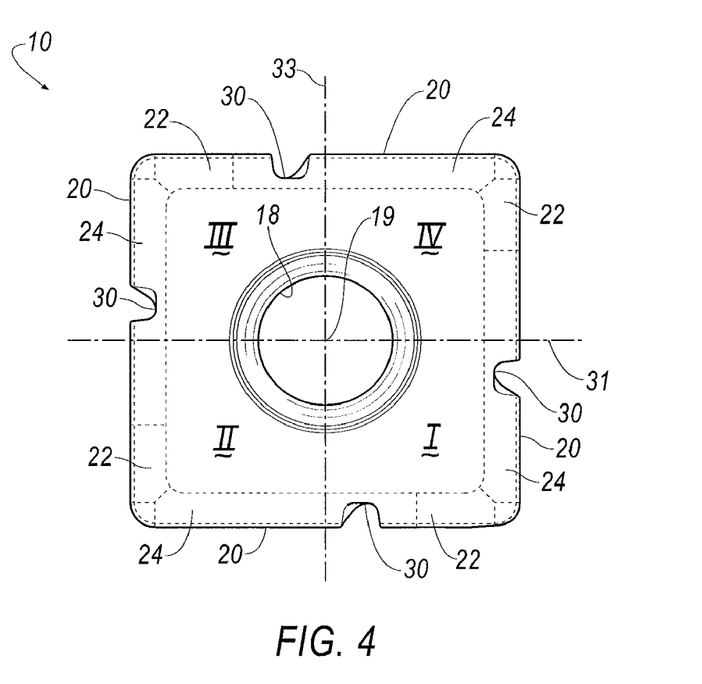
FIG. 4 is another top view of the cutting insert of FIG. 3 when rotated ninety degrees.

One aspect of the invention is that the cutting insert 10 includes a serration 30 formed at specific locations in each of the side surfaces 16. The serrations 30 extend from the top surface 12 to the bottom surface 14 and can be ground or pressed into the side surfaces 16 of the cutting insert 10. The serrated cutting edges 20 enable higher metal removal rates as compared with cutting inserts having non-serrated cutting edges. In the illustrated embodiment, the cutting insert 10 includes a total of four serrations 30 formed in each of the four side clearance surfaces 16. As shown in FIGS. 1 and 2, each serration 30 is substantially tear-drop in shape. In other words, each serration 30 has a width proximate the top surface 12 that gradually increases as the serration 30 approaches the bottom surface 14 of the cutting insert 10. A bottom surface 30a of each serration 30 is beveled such that each serration 30 is bowl-shaped.

As shown in FIGS. 1 and 2, the serrations 30 are located such that the wiper facets 22 remain intact, thereby maintaining full use of the wiper facet 22. In addition, the serrations 30 are located so as to form a rectangular pattern, indicated by the dashed lines in FIGS. 1 and 2. In other words, the serrations 30 are not located ninety (90) degrees from each other, but are mirror symmetric about two axes 31, 33 (x- and y-axes) that pass through the centerline axis 19 (z-axis) and are perpendicular to each other in the same 2-dimensional plane such that two corners of the cutting insert 10 have serrations 30 that are located closer than the other two corners. As shown in FIG. 1, the cutting insert 10 has four quadrants I, II, III and IV that are defined by the two axes 31, 33 (x- and y-axes) through the centerline axis 19 (z-axis) of the cutting insert 10. The serrations 30 are located such that the two quadrants (I and III) that are diagonally opposite each other include a pair of serrations 30, while the other two quadrants (II and IV) that are diagonally opposite each other do not include any serrations 30. This arrangement of serrations 30 provides for a right-handed cutting insert. It will be appreciated that the invention can be practiced by locating a pair of serrations 30 in the two quadrants (II and IV), rather than in the two quadrants (I and III) to provide a left-handed cutting insert. The right-handed or left-handed cutting inserts reduces the size of the clearance behind the cutting edge 20, as compared to a universal-handed insert that would lose too much seating area because of the amount of clearance needed.

Referring now to FIGS. 11-14, the cutting insert 10 can be arranged in various patterns on a milling cutter, shown generally at 100. In general, the milling cutter 100 has an axis of rotation 101 and comprises a cutter body 102 having a rear shank 104 and a plurality of cutting portions 106 adjacent a front face 108 of the cutter body 102 that extend axially along a respective flute 112. Each cutting portion 106 comprises a plurality of replaceable and indexable serrated cutting inserts 10 secured to a respective pocket 110.

Figure 11:
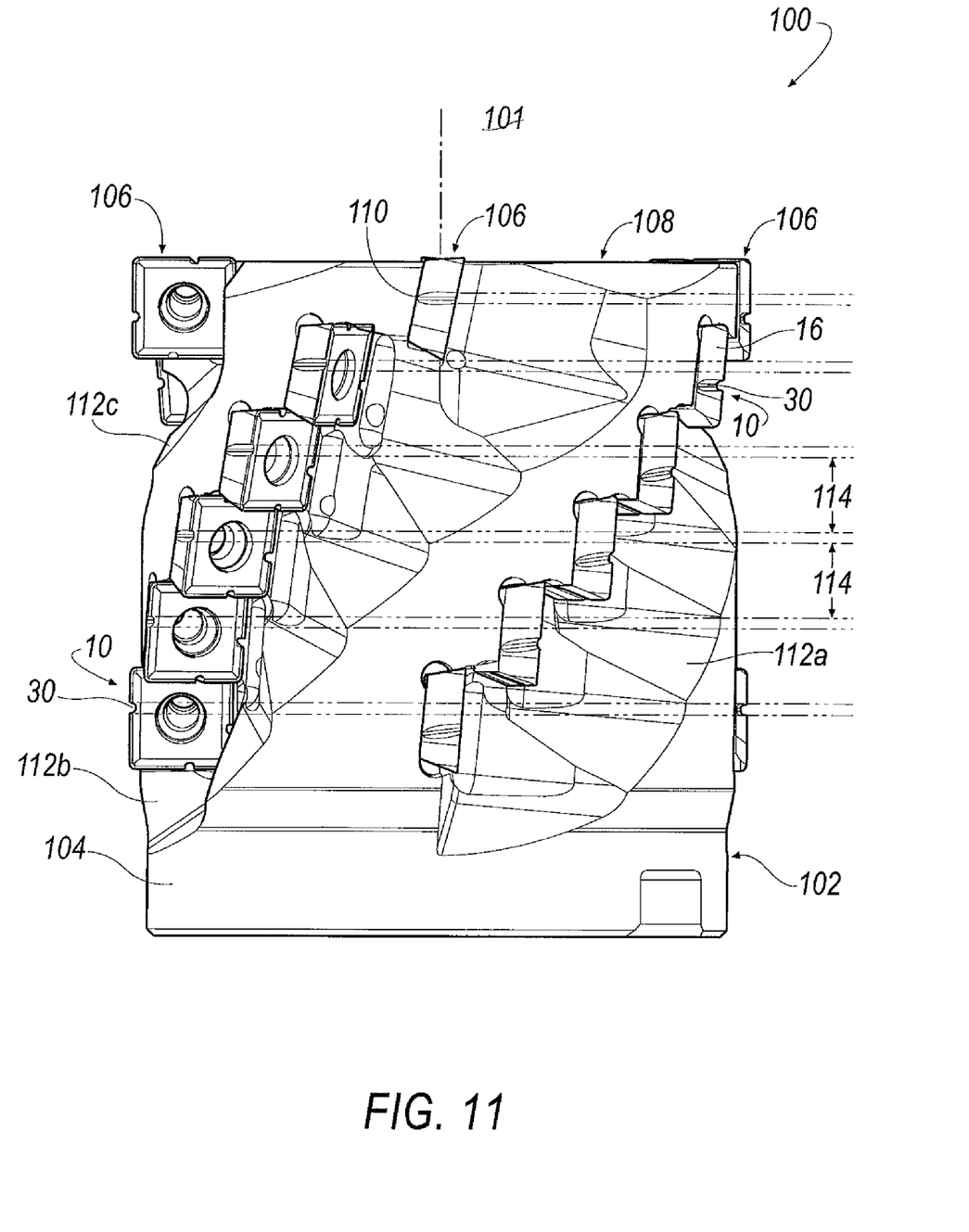
FIG. 11 is a side view of a milling cutter and the cutting insert of the invention mounted to pockets of the milling cutter such that serrations in one flute alternate with the serrations in an adjacent flute in an example of a simple alternating flute pattern.
Figure 12:
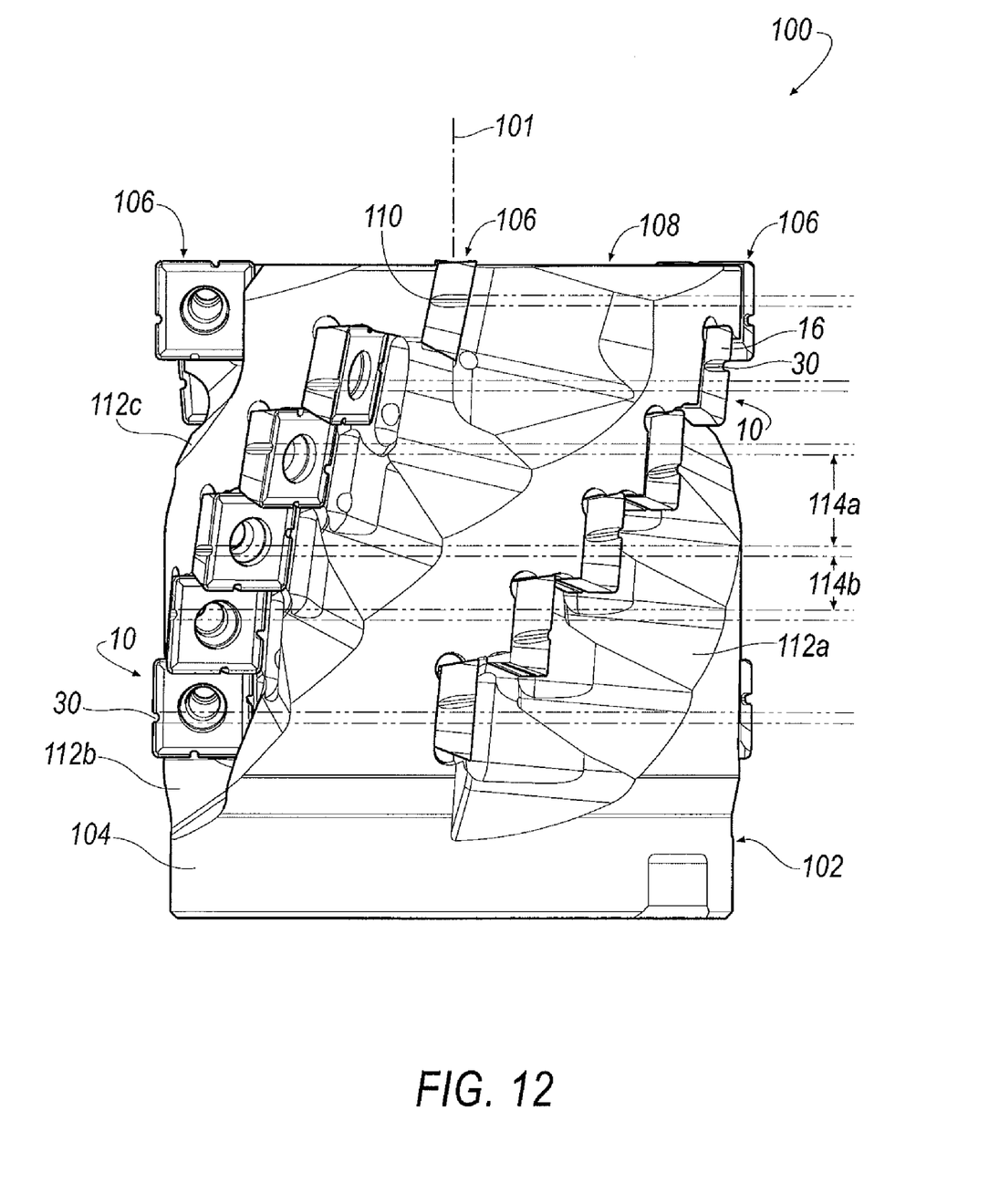
FIG. 12 is a side view of a milling cutter and the cutting insert of the invention mounted to pockets of the milling cutter such that serrations in one flute alternate with each other and with the serrations in an adjacent flute in an example of a simple alternating rows within a flute pattern.

As shown in FIG. 11, the cutting inserts 10 are arranged in the pockets 110 of one flute 112a of the milling cutter 100 such that each serration 30 of each insert 10 does not extend beyond the pocket 110. By contrast, the cutting inserts 10 that are arranged in the pockets 110 of an adjacent flute 112b have been rotated ninety (90) degrees with respect to the inserts 10 at the same axial location in the flute 112a. As a result, each serration 30 of each insert 10 in the flute 112b extends beyond the pocket 110 and is axially offset with respect to each serration 30 in the preceding, adjacent flute 112a, as indicated by the dashed lines in FIG. 11. It should be noted that the distance 114 between the serrations 30 of the inserts 10 in each flute 112 is uniform. This alternating arrangement of the serrations 30 of the cutting inserts 10 can continue for the other two flutes 112c and 112d in the four flute design shown in FIG. 6. Thus, the serrations 30 of the cutting inserts 10 in the flutes 112a and 112c will be axially aligned with each other, while the serrations 30 of the cutting inserts 10 in the flutes 112b and 112d will be axially aligned with each other, but offset with respect to the serrations 30 in the cutting inserts 10 in the flutes 112a and 112c. This arrangement of simple alternating flutes provides a milling cutter 100 capable of performing a complete pass using only two identical inserts in which one insert is rotated ninety (90) degrees with respect to the insert in the adjacent flute Another arrangement of the cutting inserts 10 in the pockets 110 of the milling cutter 100 is shown in FIG. 12. In this arrangement, the cutting inserts 10 in the flute 112a are positioned such that the location of the serrations 30 alternate from one cutting insert to another in the same flute. By contrast, the cutting inserts 10 in the flute 112b are rotated ninety (90) degrees with respect to the cutting insert 10 in the same position in the flute 112a such that each serration 30 in the flute 112b is axially offset with respect to each serration 30 in the preceding flute 112a, as indicated by the dashed lines in FIG. 12. It should be noted that the distance 114 between the serrations 30 of the inserts 10 in each flute 112 is non-uniform. In fact, the serrations 30 of the inserts 10 in each flute 112 are separated by two distances 114a, 114b. This arrangement of simple alternating rows within a flute also provides a milling cutter 100 capable of performing a complete pass using only two identical inserts in which one insert is rotated ninety (90) degrees with respect to an insert in the adjacent flute.

Figure 13:
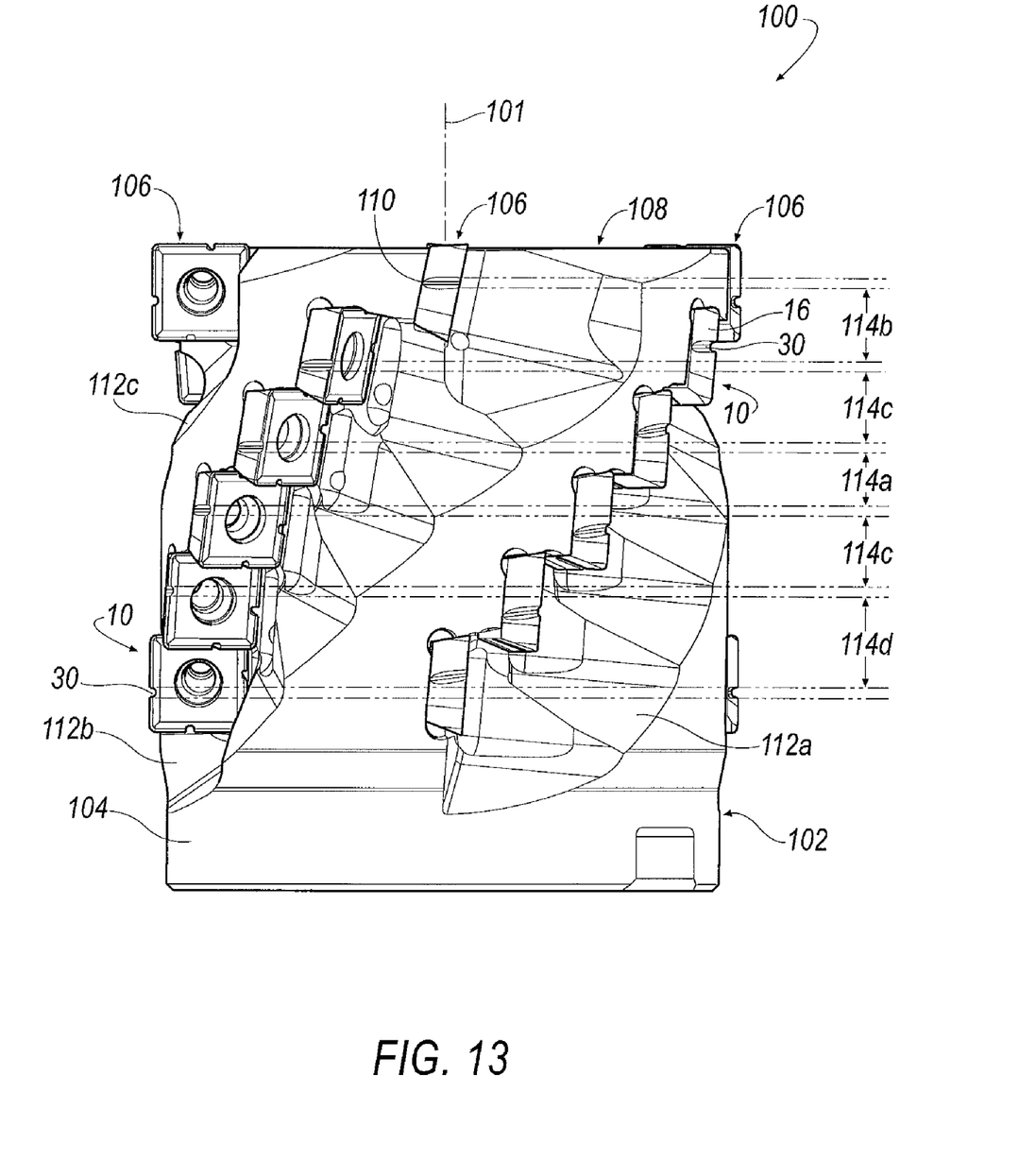
FIG. 13 is a side view of a milling cutter and the cutting insert of the invention mounted to pockets of the milling cutter such that serrations in one flute alternate with the serrations in the adjacent flute in an example of an irregular pattern in flute variation.

Another arrangement of the cutting inserts 10 in the milling cutter 100 is shown in FIG. 13. In this arrangement, the cutting inserts 10 in the flute 112a are rotated such that the location of the serrations 30 in two adjacent inserts are identical, and then the next two adjacent inserts are rotated ninety (90) degrees such that the location of the serrations 30 alternate from one pair of cutting inserts to another pair of cutting inserts in the same flute. By contrast, the cutting inserts 10 in the flute 112b are rotated such that the location of the serrations 30 are axially offset with respect to each serration 30 in the preceding flute 112a, as indicated by the dashed lines in FIG. 13. It should be noted that the distance 114 between the serrations 30 of the inserts 10 in each flute 112 is non-uniform. In fact, the serrations 30 of the inserts 10 in each flute 112 are separated by four distances 114a, 114b, 114c and 114d. This arrangement of an irregular pattern in flute variation provides a milling cutter 100 capable of performing a complete pass using only two identical inserts in which one insert is rotated ninety (90) degrees with respect to an insert in the same axial position in the adjacent flute.

Figure 14:
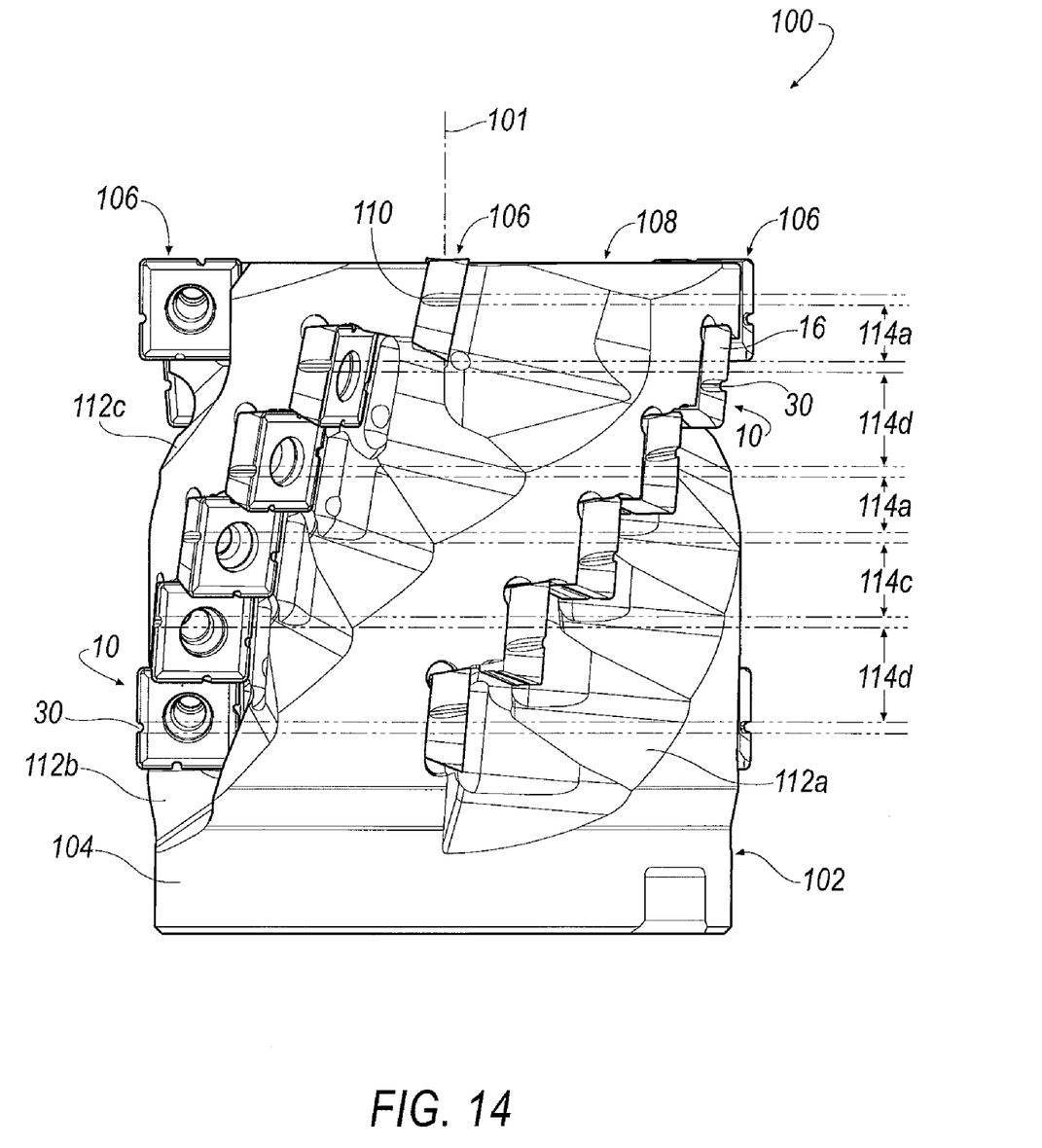
FIG. 14 is a side view of a milling cutter and the cutting insert of the invention mounted to pockets of the milling cutter such that serrations in one flute alternate with the serrations in the adjacent flute in another example of an irregular pattern in flute variation.

Yet another arrangement of the cutting inserts 10 in the milling cutter 100 is shown in FIG. 14. In this arrangement, the cutting inserts 10 in the flute 112a are positioned such that the location of the serrations 30 in the top two inserts alternate by rotating one of the cutting inserts ninety (90) degrees with respect to the other cutting insert, and then the next pair of cutting inserts are rotated ninety (90) degrees such that the location of the serrations 30 alternate from the adjacent cutting insert, and then the pattern repeats. By contrast, the cutting inserts 10 in the flute 112b are positioned such that the location of the serrations 30 in the cutting inserts 10 alternate with respect to the cutting inserts 10 in the flute 112a so as to be axially offset with respect to each serration 30 in the preceding flute 112a, as indicated by the dashed lines in FIG. 14. It should be noted that the distance 114 between the serrations 30 of the inserts 10 in each flute 112 is non-uniform. In fact, the serrations 30 of the inserts 10 in each flute 112 are separated by three distances 114a, 114c and 114d. This arrangement of an irregular pattern in flute variation provides a milling cutter 100 capable of performing a complete pass using only two identical inserts in which one insert is rotated ninety (90) degrees with respect to an insert in the adjacent flute.

It will be appreciated that the invention can be practiced with many other possible combinations of patterns of cutting inserts. It will also be appreciated that the cutting insert 10 can be used in conventional milling cutters or other metal cutting tools with a different number of flutes. For example, the cutting insert 10 can be used in a milling cutter with an odd number of flutes, such as three flutes. In such a milling cutter, the cutting insert 10 can be mounted to the pockets of two flutes of the cutting portion, while conventional inserts can be mounted to one or more flutes of the cutting portion to balance out the cutting action and provide a full cut with one rotation of the milling cutter. The cutting inserts 10 can be mixed and matched and interchanges easily without worry of damage to the cutter body.

As described above, a cutting insert with serrations is provided that improves the surface finish by mounting the cutting on the milling cutter in predetermined patterns with the serrations of consecutive cutting inserts offset, or out of phase, in relation to each other. The cutting inserts can be used with conventional inserts where necessary to balance out the cutting action to provide a full cut with one rotation of the milling cutter, while being easily interchangeable without worry of damage to the cutter body.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting insert having a centerline axis perpendicular to both a horizontal axis (x-axis) and a vertical axis (y-axis), the vertical and horizontal axes being perpendicular to each other in a two-dimensional plane and intersecting the centerline axis to define four quadrants, the cutting insert comprising:
   a top surface;
   a bottom surface;
   a plurality of clearance side surfaces extending between the top and bottom surfaces;
   a cutting edge formed at an intersection between the top surface and the plurality of clearance side surfaces; and
   a serration formed in each clearance side surface, wherein two of the four quadrants that are diagonally opposite each other do not have serrations, and wherein the other two of the four quadrants that are diagonally opposite each other include a pair of serrations.

2. A cutting insert according to claim 1, wherein a total number of serrations equals a total number of clearance side surfaces.

3. A cutting insert according to claim 1, further comprising a wiper facet formed in the top surface of each quadrant of the insert.

4. A cutting insert according to claim 1, wherein each serration extends from the top surface to the bottom surface.

5. A cutting insert according to claim 1, wherein each serration has a width proximate the top surface that gradually increases as the serration approaches the bottom surface of the cutting insert.

6. A cutting insert having a centerline axis perpendicular to both a horizontal axis (x-axis) and a vertical axis (y-axis), the vertical and horizontal axes being perpendicular to each other in a two-dimensional plane and intersecting the centerline axis to define four quadrants, the cutting insert comprising:
   a top surface;
   a bottom surface;
   a plurality of clearance side surfaces extending between the top and bottom surfaces;
   a cutting edge formed at an intersection between the top surface and each clearance side surface;
   a wiper facet formed in the top surface; and
   a serration formed in each clearance side surface, wherein two of the four quadrants that are diagonally opposite each other do not have serrations, and wherein the other two of the four quadrants that are diagonally opposite each other include a pair of serrations, and wherein each serration is located so as to leave the wiper facet intact.

7. A cutting insert according to claim 6, wherein a total number of serrations equals a total number of clearance side surfaces.

8. A cutting insert according to claim 6, wherein each serration extends from the top surface to the bottom surface.

9. A cutting insert according to claim 6, wherein each serration has a width proximate the top surface that gradually increases as the serration approaches the bottom surface of the cutting insert.

10. A milling cutter comprising a cutter body having a rear shank and a plurality of cutting portions adjacent a front face of the cutter body that extend axially along a respective flute, each cutting portion comprises a plurality of cutting inserts secured to a pocket; each cutting insert having a centerline axis perpendicular to both a horizontal axis (x-axis) and a vertical axis (y-axis), the vertical and horizontal axes being perpendicular to each other in a two-dimensional plane and intersecting the centerline axis to define four quadrants, each cutting insert comprising a top surface; a bottom surface; a plurality of clearance side surfaces extending between the top and bottom surfaces; a cutting edge formed at an intersection between the top surface and the plurality of clearance side surfaces; and a serration formed in each clearance side surface, wherein two of the four quadrants that are diagonally opposite each other do not have serrations, and wherein the other two of the four quadrants that are diagonally opposite each other include a pair of serrations.

11. A milling cutter according to claim 10, wherein each serration of each cutting ins en in one of the cutting portions is axially offset with respect to each serration of each cutting insert in an adjacent cutting portion.

12. A milling cutter according to claim 10, wherein each cutting insert mounted in a respective pocket of one of the cutting portions is positioned such that each serration does not extend beyond the pocket.

13. A milling cutter according to claim 10, wherein each cutting insert mounted in a respective pocket of one of the cutting portions is positioned such that each serration extends beyond the pocket.

14. A milling cutter according to claim 10, wherein each cutting insert mounted in a respective pocket of one of the cutting portions is positioned such that at least one serration does not extend beyond the pocket and at least one serration extends beyond the pocket.

15. A milling cutter according to claim 10, wherein each serration has a width proximate the top surface that gradually increases as the serration approaches the bottom surface of the cutting insert.

16. A milling cutter according to claim 10, wherein the cutting insert further comprises a wiper facet formed in the top surface, and wherein each serration is located so as to leave the wiper facet intact.

* * * * *